(12) United States Patent
Frigerio et al.

(10) Patent No.: US 11,428,339 B2
(45) Date of Patent: Aug. 30, 2022

(54) VALVE

(71) Applicant: Parker-Hannifin EMEA Sarl, Etoy (CH)

(72) Inventors: Paola Frigerio, Olginate (IT); Jean-Charles Borsatti, Onex (CH); Stefano Gavazzi, Alzano Lombardo (IT)

(73) Assignee: Parker Hannifin EMEA Sarl, Etoy (CH)

( * ) Notice: Subject to any disclaimer, the term of this patent is extended or adjusted under 35 U.S.C. 154(b) by 0 days.

(21) Appl. No.: 17/376,265

(22) Filed: Jul. 15, 2021

(65) Prior Publication Data
US 2022/0025987 A1  Jan. 27, 2022

(30) Foreign Application Priority Data

Jul. 21, 2020  (IT) .......................... 102020000017629

(51) Int. Cl.
*F16K 27/02* (2006.01)
*A47J 31/46* (2006.01)

(52) U.S. Cl.
CPC ........... *F16K 27/029* (2013.01); *A47J 31/461* (2018.08)

(58) Field of Classification Search
CPC .................................................. F16K 27/029
See application file for complete search history.

(56) References Cited

U.S. PATENT DOCUMENTS

| 5,771,918 A | 6/1998 | Fukano et al. |
| 6,422,258 B1 * | 7/2002 | DuHack ................ F16K 27/029 |
| | | 137/315.03 |
| 10,167,975 B2 * | 1/2019 | Pampel ............... F16K 31/0655 |

FOREIGN PATENT DOCUMENTS

| EP | 1508734 | 2/2005 |
| IT | UA20164402 | 12/2017 |

* cited by examiner

*Primary Examiner* — Eric Keasel
(74) *Attorney, Agent, or Firm* — Renner, Otto, Boisselle & Sklar, LLP

(57) ABSTRACT

A valve (1) comprising a valve body (2) and a cartridge element (6), the valve body (2) having at least one seat (2A) configured to accommodate at least partially the cartridge (6), the cartridge (6) comprising an external surface (6A) configured to support at least partially an actuation element (12), said cartridge (6) containing at least one core (11) configured to cooperate with a nozzle (15) fluidly connected with a first fluid passage (3), said core (11) being movable inside said cartridge (6) against the action of an elastic element (14), between at least one first position in which it closes the first passage (3) and a second position in which it allows a flow through the first passage (3) so as to control the flow of a fluid through the valve; the valve comprises quick coupling means (200) for coupling to a support guide (201) of the valve (1).

8 Claims, 2 Drawing Sheets

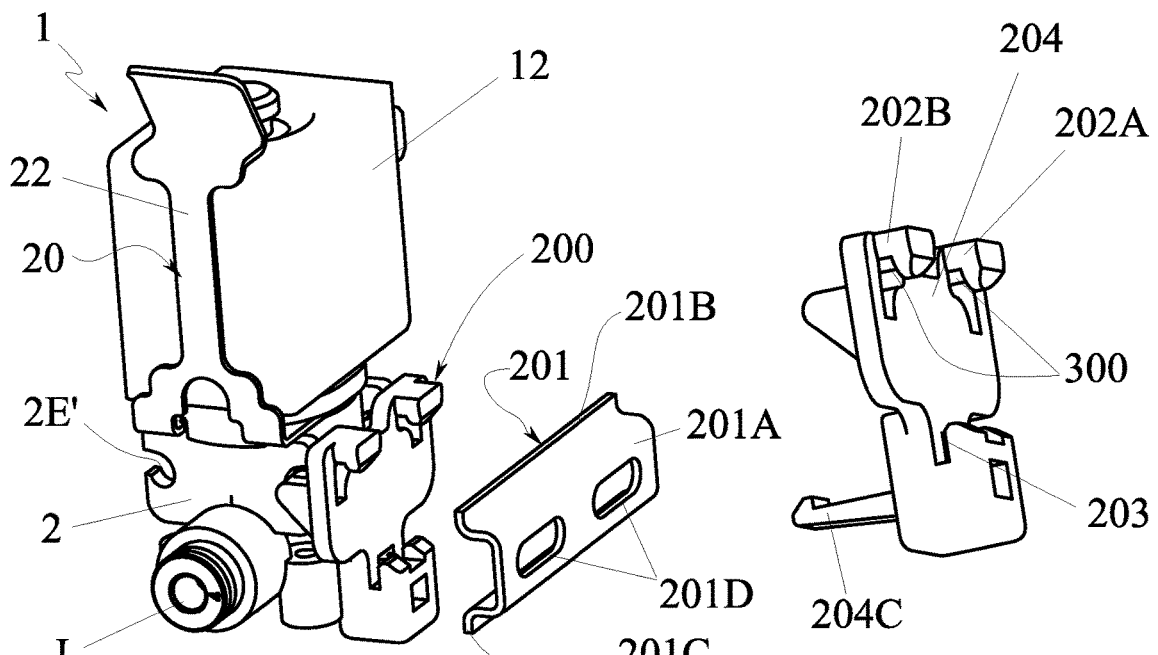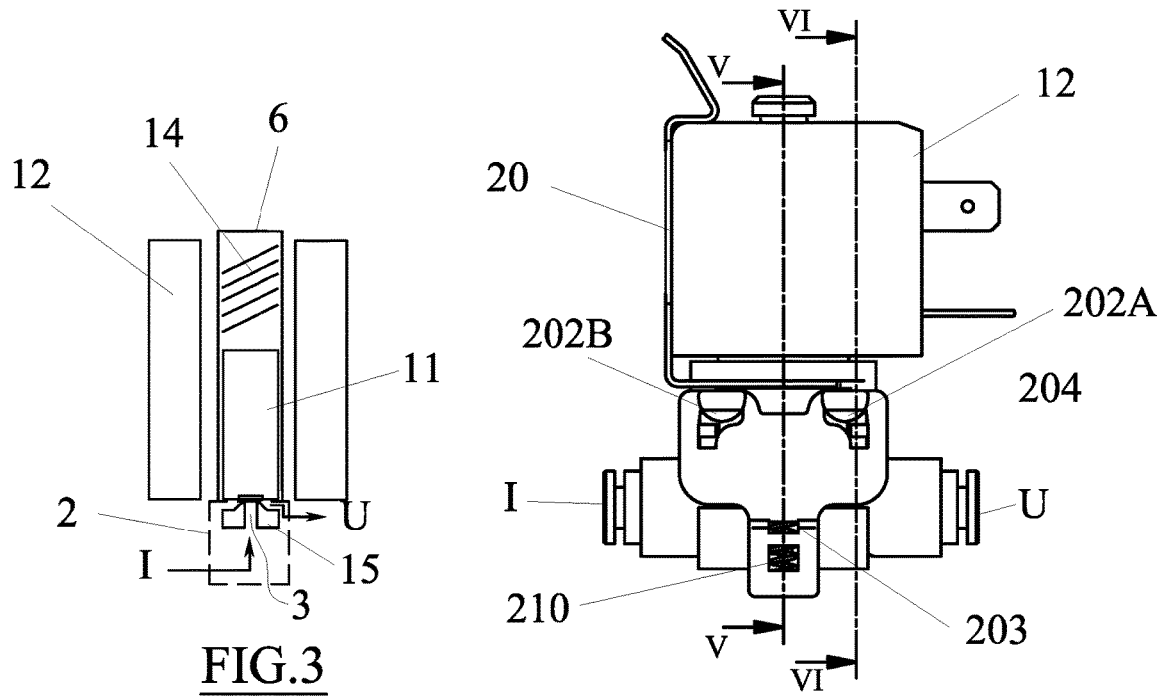

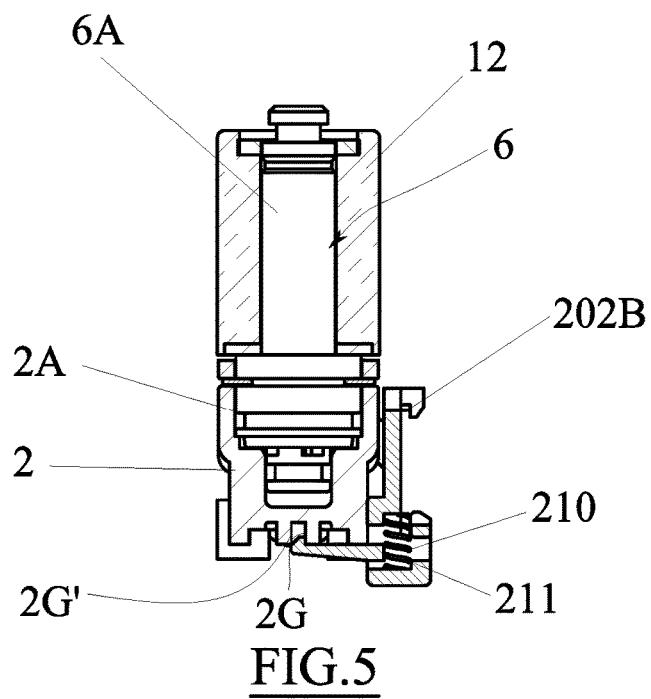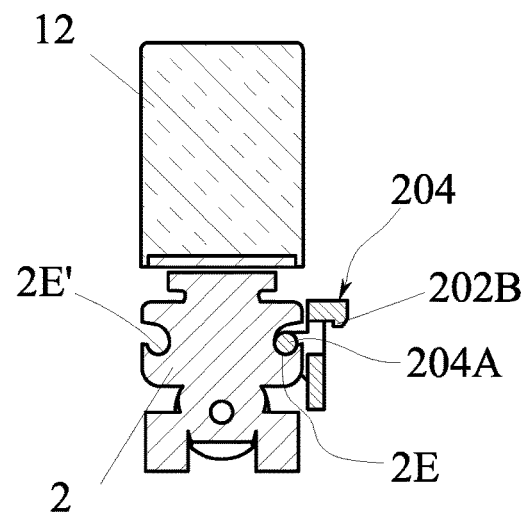
FIG.5  FIG.6
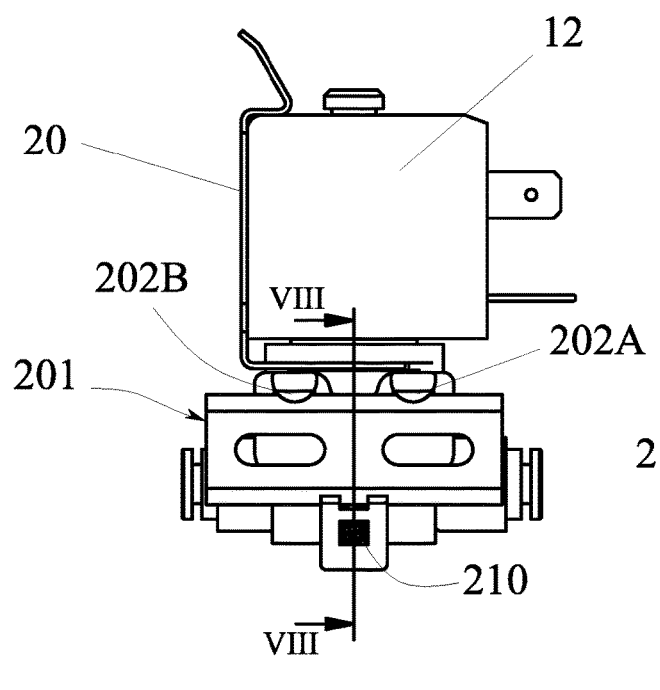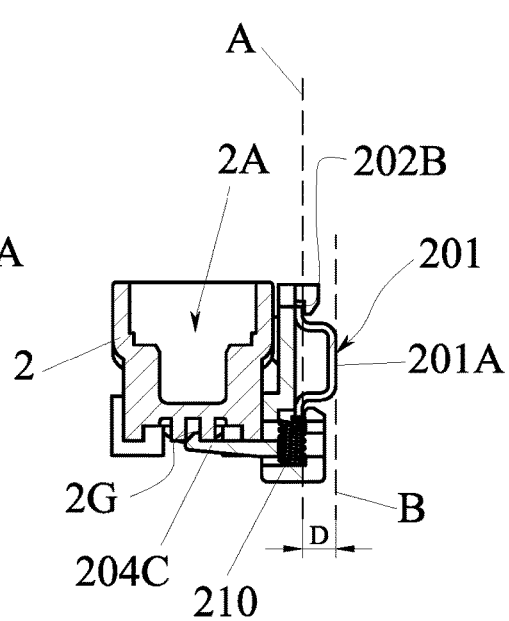
FIG.7  FIG.8

VALVE

TECHNICAL BACKGROUND

The object disclosed here corresponds to a valve. In particular, it refers to a solenoid valve.

More in particular, it refers to a solenoid valve to be used to intercept or control the flow of different fluids intended in particular for food and other use such as coffee machines or dispensers of water and/or syrups or in steam sterilizers or general steam generators in the electromedical field.

PRIOR ART OF THE INVENTION

Valves used for intercepting the most disparate fluids have been commercially available for some time. Such valves are highly used above all, but not exclusively, in the coffee machine sector, in particular for machines of professional type.

In the following description, reference will be made, by way of example, to a valve installed in a professional coffee machine, but it is understood that such a valve can be used in any type of machine.

Professional coffee machines have a boiler connected to a dispensing unit by suitable passages for fluids that are interceptable by solenoid valves. In some examples of coffee machines, the dispensing unit comprises an inlet and an outlet passage. The outlet passage communicates with the spray head of the coffee machine, whereas a suitable boiler supplies hot water to the inlet port.

A valve of conventional type comprises a valve body with an inlet and an outlet, advantageously provided with quick couplings, that are connected by small pipes respectively to the boiler and to the spray head.

The valve body is usually fixed by screws to a wall or to another zone of the machine set up for supporting the valve (or a group of valves).

In the valve body, there is one seat or an internally threaded blind hole intended to accommodate a cartridge at least partially. The cartridge substantially defines an active part of the valve that opens and closes a fluid passage. The blind hole communicates appropriately with the inlet and with the outlet arranged on the valve body.

The blind hole or the seat accommodates a cartridge at least partially.

The cartridge comprises an outer ring or flange, which can be welded to a pipe, intended to be fixed in the seat of the valve body or by a thread or as disclosed for example in patent IT 102016000061752.

The first active part can consist of two macroelements, known as a core (or rather movable core) and sleeve assembly.

An arrest element is welded to an end of the cartridge and closes the cartridge. This arrest element can be of different type, depending on the type of valve with which it is coupled. In particular, it can distinguish a three-way valve from a two-way valve.

The further conventional element of the active part (otherwise known as movable core or movable core) moves with a translating motion opposing a spring inside the active part between a first and a second position. When the movable core is in the first position, the movable core rests against the nozzle, closing a passage that is in fluid connection with either the outlet port or the inlet port (usually with the inlet port). When the movable core is in the second position, the movable core frees the passage of the nozzle, consequently permitting a flow of the fluid between the inlet port and the outlet port of the valve body.

The movable core is actuated by a solenoid mounted on the active part. The solenoid has a through hole having a diameter that is slightly greater than the outer diameter of the cartridge. The solenoid is mounted on the cartridge via the through hole.

In order to avoid undesired removal of the solenoid, a bolt or anther stop means (for example a flexible blade) cooperates with the solenoid.

When the solenoid is not excited, the core is in the first position and the dispensing unit is not supplied. When the solenoid is excited, the core is moved to the second position.

Accordingly, pressurized hot water (or another liquid to be treated) can flow through the inlet and the outlet of the valve to supply the spray head or convey the fluid where necessary.

This type of valve requires a certain maintenance that is usually performed by cleaning or replacing the components of the active part.

This operation may require a lot of time and be rather inconvenient, especially in professional coffee machines, or in other types of machines that are equipped with a plurality of valves that are all grouped in the same zone of the machine.

A removable cartridge solution is also possible that permits direct replacement of the cartridge, which in this case also supports the nozzle.

In order to replace the used cartridge, if the cartridge is not directly accessible, it is necessary to unscrew the valve body from the wall to which it is fixed. At this point, it is possible to remove the solenoid from the cartridge and replace the cartridge.

This operation can be difficult when the valves are mounted in confined spaces, as commonly occurs in coffee machines or in other types of machines. In fact, there is a tendency to group all the valves in a single technical chamber, which normally also accommodates all the devices and components necessary for operating the machine. The space inside the chamber available for maintenance of the different components, in particular the valves, is often very confined.

It should also be said that the operation of installing the valve in said technical chambers, for example an assembly step, is rather laborious.

In fact, there is a tendency to supply valves that are already assembled and fixing screws of the valve body are usually tightened only after that the hydraulic pipes, that are necessary for correct operation of the valve, have been connected.

SUMMARY

One object of the present invention is to supply an improved valve that permits easier maintenance and installation.

Another object of the present invention is to provide a valve that is adaptable to rapid installation and without the assistance of specific equipment.

These and other objects are achieved by a valve conforming to the technical teachings of the attached claims.

SHORT DESCRIPTION OF THE DRAWINGS

The attached drawings that are incorporated in this draft and constitute part of the specification, illustrate embodiments of the present invention by way of non-limiting example and, together with the detailed description, explain these embodiments.

In the drawings:

FIG. 1 is a perspective view, partially exploded, of some parts of the valve of the present invention;

FIG. 2 is a perspective view of a part of the valve of FIG. 1;

FIG. 3 is a schematic view of a part of the valve of FIG. 1;

FIG. 4 is a rear view of the valve of FIG. 1, but devoid of a fixing guide;

FIG. 5 is a simplified cross section view taken along the line of section V-V of FIG. 4;

FIG. 6 is a simplified cross section view taken along the line of section VI-VI of FIG. 4;

FIG. 7 is the same view as FIG. 4 in which the guide is also present;

FIG. 8 is a simplified section, in which the cartridge is not shown, hanging along the line VIII-VIII of FIG. 7.

DETAILED DESCRIPTION

The following description of embodiments refers to the attached drawings.

The following description does not limit the invention. On the other hand, the scope of the invention is defined by the attached claims.

With reference to the figures, a valve is indicated overall by reference number 1.

The valve 1 comprises a valve body 2 and a cartridge element 6.

The valve body 2 has at least one seat 2A configured to accommodate at least partially the cartridge 6 and at least one first fluid passage 3.

Between the valve body and the cartridge, conventional seal means can be provided like for example O-rings, not shown in the figures. Conventional fixing means can also be present (threads, quick couplings etc).

The fluid passage 3, which can be part of a nozzle 15, can be made integrally in the valve body.

Or the nozzle can be a different element from the valve body and be fixed in a suitable housing provided in the valve body.

Also, the nozzle can be integrated into the cartridge and be removable therewith.

In use, the fluid passage 3 is always in communication with either an inlet I or an outlet U present on the valve body, possibly associated with quick couplings, and can be in communication with either the outlet U and the inlet I of the valve body, depending on the state of opening or closure of the valve.

The cartridge 6 comprises an external surface 6A configured to support at least partially an actuation element 12, which can be an electrically actuated solenoid.

The valve operates as shown schematically in FIG. 3.

The cartridge 6 contains at least one core 11 (or rather movable core) configured to cooperate with the nozzle 15 fluidly connected to, or rather that defines, said first fluid passage 3.

The core 11 is movable inside the cartridge 6 against the action of an elastic element 14 (for example a conventional spring), between at least one first position in which it closes the first passage 3 and a second position in which it allows a flow through the first passage 3 so as to control the flow of a fluid through the valve, for example between said inlet I and said outlet U.

In the case of a three-way valve, the flow coming from the inlet can be simply "sorted" between a further outlet (not shown) and the U. outlet, i.e. in a completely conventional manner via the movement of the core (or movable core).

In the shown embodiment, the core 11 can be made of ferromagnetic material, so as to be moved in opposition to the spring 14 by exciting the solenoid 12 in a completely conventional manner.

FIG. 1 shows a valve 1 that can feature a fixing bracket 20 (or clip) having a first part (not shown) configured to constrain the cartridge 6 on the valve body 2 and a second part 22 cooperating elastically with said actuation element 12 to fix said actuation element 12 to the valve body 2.

Obviously, however, fixing the actuation element 12 to the cartridge 6 (or to the valve body) can also occur in accordance with other methods that are conventional and known to the skilled person.

According to the invention, the valve 1 comprises quick coupling means 200 for coupling with a support guide 201 of the valve 1.

The guide 201 can comprise a substantially flat first section 201A from which at least a first and a second support 201B, 201C can extend that lie on a first plane A spaced apart from a second plane B on which the first section 201A lies (see FIG. 4). In the first section, one or more through fixing holes 201D can be provided for fixing the guide to a wall or anyway to a structure that is suitable for supporting the valve.

Instead of the holes, other fixing means can be provided for fixing the guide 201 to any part of the machine in which the valve can be installed.

Advantageously, said quick coupling means 200 has at least one first coupling 202A which cooperates as an undercut with the first support 201B of the guide 201 and a second coupling 203 that cooperates elastically with the second support 201C of the guide 201.

Advantageously, two first couplings, 202A and 202B, can be associated with the valve body 2, which are shaped in a manner that is substantially identical and which are reciprocally spaced apart (along a longitudinal axis of the guide).

The first coupling 202A can comprise a housing 300 (for example with an overturned U section) for said first support 201B. In fact, the housing 300 can fit directly onto the first support 201B of the guide, and can be so configured that the weight of the valve maintains the first support 201B embedded in the housing 300.

The second coupling 203 can on the other hand feature a spring element 210 (or another element of elastic type) accommodated in a blind hole 211 made on the bottom of a groove 212 of the second coupling 203 (see FIG. 5).

In this manner, in order to fit the valve to the guide, it is sufficient to insert the second support 201C into the groove 212 so as to compress the spring, and simultaneously align the housing 300 on the first support 201B. Then leaving the valve, the weight force and the spring 210 stabilize the valve, coupling the valve firmly with the guide 201.

The removal operation occurs in the opposite direction to what has been disclosed, thus the valve is raised so as to compress the spring 210 and tilt the valve so as to space the valve apart from the first support 201B of the guide.

In the configuration illustrated above (and also in the configuration illustrated in the drawings) the guide 201 has a hat or omega-shaped cross section, and can be of DIN-standard type.

However, nothing prevents the guide 201 from being able to have another configuration, for example of the C or G type or being simply a suitably punched/shaped sheet.

In this case, the coupling/quick release system may be different from the system described here and be anyway suitable for cooperating with the form of guide used.

In one embodiment that is not shown in the drawings, said quick coupling means 200 can be directly integrated into the valve body 2A.

As shown for example in the present embodiment, the quick coupling means 200 can be on the other hand made of an intermediate element 204 that, in use, is interposed between the valve body 2 and the guide 201.

The intermediate element 204 can be stably fixed to the valve body 2 in different ways, but is preferentially fixed by snap means.

For example, the intermediate element 204 can comprise at least one pin 204A (FIG. 6) accommodated in a first cradle seat 2E of the valve body 2 and a flexible fin 204C which engages as an undercut and in a snap manner a first step 2G of the valve body 2 itself.

The flexible fin may possibly have a free end, a tooth that engages the step 2G, exploiting the longitudinal flexibility of the fin.

Preferentially, two pins 204A can be provided, each accommodated in one corresponding cradle seat 2E.

Further, in order to make installation of the valve more flexible, the valve body 2 can comprise at least one second cradle seat 2E' and a second step 2G' arranged so as to permit coupling with the intermediate element 204 on a wall of the valve body 2 opposite the wall on which the intermediate element 204 couples when it is engaged with the at least one first cradle seat 2E and the first step 2G.

Various embodiments of the innovation have been disclosed but others can be conceived that exploit the same innovative concept.

The invention claimed is:

1. A valve comprising:
a valve body and a cartridge element, the valve body having a seat configured to accommodate at least partially the cartridge, the cartridge comprising an external surface configured to support at least partially an actuation element, the cartridge containing at least one core configured to cooperate with a nozzle fluidly connected with a first fluid passage, the at least one core being movable inside the cartridge against the action of an elastic element, between at least a first position in which the at least one core closes the first passage and a second position in which the at least one core allows a flow through the first passage so as to control the flow of a fluid through the valve,
a valve support guide, and an intermediate element interposed between the valve body and the valve support guide;
wherein the at least one core comprises a quick coupling configured to couple the valve to the valve support guide, the quick coupling comprising a first coupling cooperating as an undercut with a first support of the valve support guide and a second coupling configured to cooperate elastically with a second support of the valve support guide, the quick coupling being made on the intermediate element interposed between the valve body and the valve support guide, the intermediate element being fixed to the valve body.

2. The valve according to claim 1, wherein the intermediate element comprises at least one pin accommodated in a first cradle seat of the valve body and a flexible fin which engages undercut a first step of the valve body itself.

3. The valve according to claim 2, wherein the quick coupling has at least a first coupling which cooperates in an undercut manner with a first support of the valve support guide and a second coupling which cooperates elastically with the second support of the valve support guide.

4. The valve according to claim 1 wherein the valve body comprises at least a second cradle seat and a second step arranged so as to allow coupling with the intermediate element on a wall of the valve body opposite to the wall on which the intermediate element is coupled when engaged with the at least a first cradle seat and the first step of the valve body.

5. The valve according to claim 1, wherein the guide comprises a flat first section from which at least a first and a second support extend which lie in a first plane spaced from a second plane where the first section lies, the first section optionally presenting through holes for fixing the valve support guide to a wall.

6. The valve according to claim 1, wherein a first coupling comprises a housing for the first support and/or where a second coupling provides a spring element housed in a blind hole made on the bottom of a groove of the second coupling.

7. The valve according to claim 1, wherein the valve support guide has an omega, C or G section.

8. The valve according to claim 1, further comprising a fixing bracket having a first part configured to constrain the cartridge to the valve body and a second part that elastically cooperates with the actuation element to fix the actuation element to the valve body.

\* \* \* \* \*